J. C. REBER.
ANTIFRICTION BEARING.
APPLICATION FILED NOV. 10, 1914.

1,144,245.

Patented June 22, 1915.
2 SHEETS—SHEET 1.

Witnesses—
Walter Chism
Willa A Burrows

Inventor—
James C. Reber.
by his Attorneys—
Howson & Howson

J. C. REBER.
ANTIFRICTION BEARING.
APPLICATION FILED NOV. 10, 1914.

1,144,245.

Patented June 22, 1915.
2 SHEETS—SHEET 2.

Witnesses—
Walter Chism
Chills A Burrows

Inventor—
James C. Reber.
by his Attorneys—
Howson & Howson

UNITED STATES PATENT OFFICE.

JAMES C. REBER, OF READING, PENNSYLVANIA.

ANTIFRICTION-BEARING.

1,144,245.  Specification of Letters Patent.  Patented June 22, 1915.

Application filed November 10, 1914. Serial No. 871,295.

*To all whom it may concern:*

Be it known that I, JAMES C. REBER, a citizen of the United States, residing in Reading, Berks county, State of Pennsylvania, have invented certain Improvements in Antifriction-Bearings, of which the following is a specification.

One object of my invention is to provide a relatively simple, efficient and substantial form of roller bearing which for a given size shall possess relatively large bearing surfaces and shall have its parts so disposed as to permit of its inexpensive manufacture under commercial conditions.

A further object of the invention is to provide an anti-friction bearing with a novel form of cage for supporting and holding together the anti-friction elements, the design of the cage being such that it is substantial and inexpensive.

Figure 1:
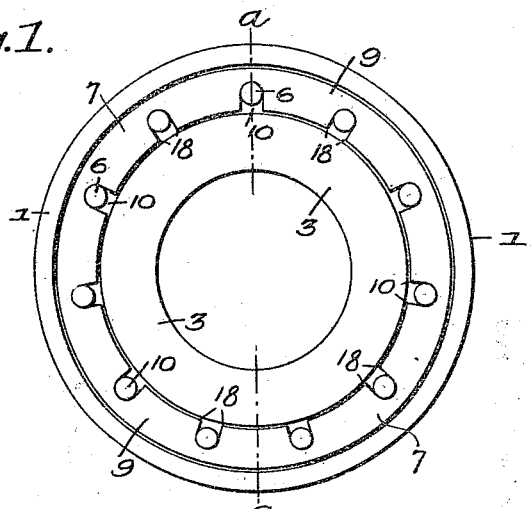
Figure 2:
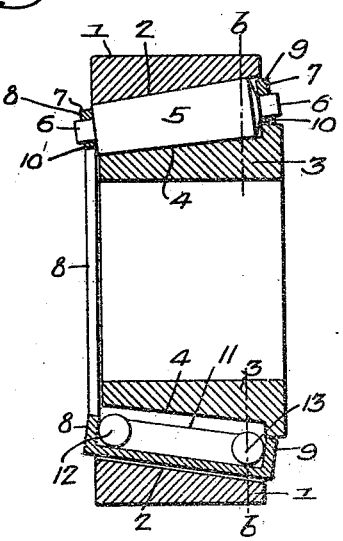
Figure 3:
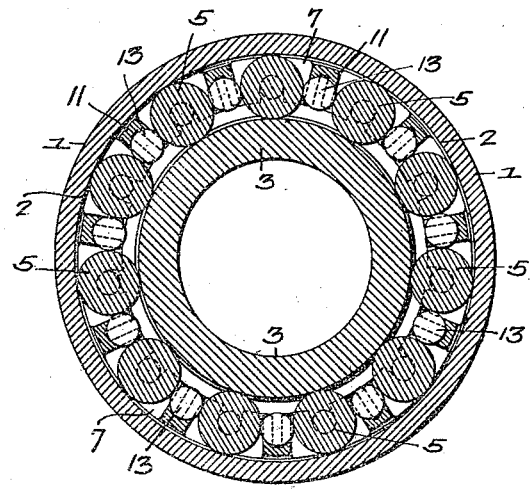
Figure 11:
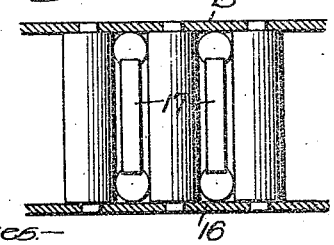
Figure 12:
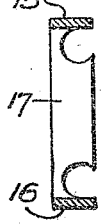
Figure 4:
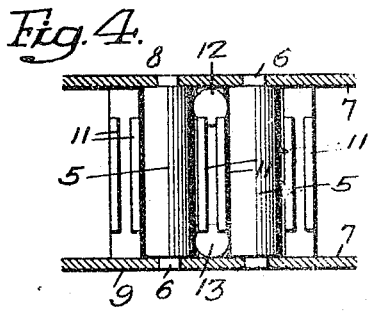
Figure 5:
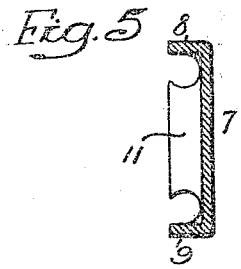
Figure 6:
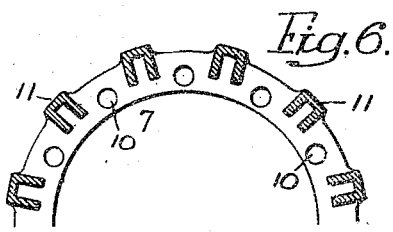
Figure 8:
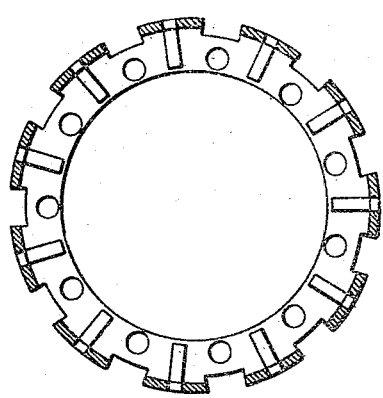
Figure 7:
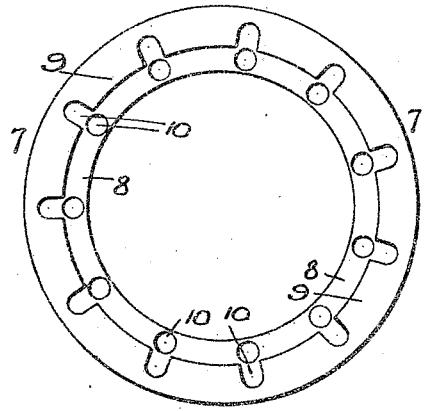
Figure 9:
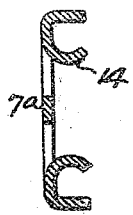
Figure 10:
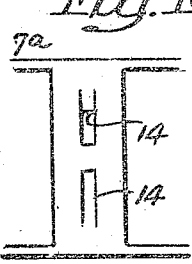

These objects and other advantageous ends I secure as hereinafter set forth, reference being had to the accompanying drawings in which, Figure 1 is a plan of an anti-friction bearing constructed according to my invention; Fig. 2 is a transverse section on the line *a—a* Fig. 1; Fig. 3 is a section on the line *b—b*, Fig. 2; Fig. 4 is a fragmentary elevation illustrating the relative positions of the cage and the anti-friction elements; Figs. 5 and 6 are fragmentary sections further illustrating the detail construction of the cage; Figs. 7 and 8 are respectively a plan and a horizontal section of a modified form of cage; Figs. 9 and 10 are respectively a transverse section and a fragmentary elevation of a portion of the cage shown in Figs. 7 and 8; and Figs. 11 and 12 are respectively a fragmentary elevation and a vertical section of another modification of my invention.

In Figs. 1 to 6 inclusive of the above drawings 1 represents the outer member of the bearing which consists of an annular structure having, in the case shown, a conical bearing surface 2. The inner bearing member 3 is also of annular form and its external surface 4 is likewise conical, all of its surface elements converging to a definite point to which also converge the elements of the surface 2. Mounted in the space between the two bearing surfaces 2 and 4 of the members 1 and 3 are a series of conical rollers 5 each of which engages both of said surfaces for the greater part of its length. Adjacent its ends however, it is provided with relatively short journals 6 operative in a cage structure 7 which consists of a pressed metal frusto-conical ring mounted between the two bearing surfaces but not contacting with either and having its edges or ends inwardly flanged as indicated at 8 and 9. The journal portion 6 of the small end of each roller is rotatably mounted in an opening 10 of the flange 8 while the journal at the opposite end of each roller likewise operates in the flange 9, which for purposes of easy assembly is provided with bearing recesses for said journals opening on its inner edge but whose width is diminished by suitable means after the introduction of the roller journals in order to prevent their removal. At predetermined intervals around its periphery the frusto-conical body of the cage has portions 11 pressed inwardly so that they lie in substantially radial planes and a roller is mounted between each two adjacent pressed in portions. The upper and lower ends of these portions 11 are cut away to provide receptacles for spacing balls 12 which are of such diameter as to accurately fit between the top and bottom portions respectively of the rollers, it being obvious that the balls 13 engaging the upper ends of the rollers are larger than those between the lower ends thereof. As shown in Fig. 5 the recesses formed by cutting away of the ends of the pressed in ribs 11 are overhung so as to prevent the balls from dropping out when the inner bearing member 3 is removed or when the cage is taken out of the bearing. Under conditions of operation the rollers are maintained at the proper distances apart by the balls 12 and 13 which with said rollers are held together by means of the cage 7 so as to be inserted or removed as a unit. Obviously the balls provide highly efficient spacing means for the rollers since they not only make point contacts with their surfaces but in addition they accurately maintain said rollers in the proper angular positions.

As shown in Figs. 7 to 10 inclusive, I may, instead of pressing in relatively long radial ribs 11 to form the supporting or retaining means for the balls 12 and 13, merely press in relatively short radially extending tongues 14 from the body 7ª of the cage, curving each pair of these respectively up and down as shown in Fig. 5 so as to form holders for said balls which will keep them in position while preventing them from dropping out of the cage after the rollers have been once assembled therein. Again as shown in Figs. 11 and 12 I may form the cage as a casting consisting of substantially parallel rings 15 and 16 rigidly connected by relatively heavy integral and radially projecting ribs 17. Each of these latter is formed to provide a cup or recess adjacent said rings which like the recesses of the cage structures 7 and 7ª, has its inner ends so overhung as to prevent the balls from falling out while leaving them free to project on either side in position to engage and properly space the rollers.

It is to be understood that it is immaterial whether the bearing surfaces 2 and 4 are convergent as shown in Fig. 2 or whether they are made in the shape of concentric parallel cylindrical surfaces. Obviously in such a case the rollers instead of being frusto-conical in form would be cylindrical. In any case however, it is to be noted that a distinguishing characteristic of the bearing lies in its inclusion of relatively long rollers each of which has a relatively long uninterrupted straight line engagement with both of the bearing surfaces of the members 1 and 3. Moreover these bearing surfaces are uninterrupted or continuous conical or cylindrical surfaces, which like the rollers, may be ground with the utmost convenience and accuracy. The cage structures are likewise relatively inexpensive to manufacture, it being understood that after the balls and rollers have been assembled, the extremities of the inwardly opening recesses 18 of the upper flange 9 of the cage are upset or expanded so as to retain the journals of the rollers in operative positions therein.

I claim:—

1. The combination in an anti-friction bearing of inner and outer bearing members; rollers operative between said members; a cage consisting of a ring flanged at both edges to provide bearings for the rollers and having radially projecting portions between the rollers; with balls confined between said portions and the flanges in positions to operatively engage the adjacent rollers respectively.

2. The combination in an anti-friction bearing of inner and outer bearing members; rollers operative between said bearings; a ring providing bearings for the rollers and having pressed out portions formed to provide retaining recesses between the rollers; with a ball held in each recess in engagement with the adjacent rollers.

3. The combination in an anti-friction bearing of inner and outer bearing members; rollers mounted between said members; a ring having projecting portions at both edges providing bearings for said rollers and formed with radially extending pressed out tongues having their ends spaced away from said projecting bearing portions; with balls retained in the spaces between said ends of the tongues and the projecting portions of the ring in positions to engage the adjacent rollers respectively.

4. The combination of a ring having flanges at both edges and provided with radially extending integral portions having overhung ends spaced away from the flanges; rollers mounted between the respective radially extending portions and journaled in the flanges; with balls rotatably mounted in the spaces between the ends of each radial portion and the adjacent flanges in positions to engage the adjacent rollers.

In testimony whereof, I have signed my name to this specification, in the presence of two subscribing witnesses.

JAMES C. REBER.

Witnesses:
 CHAS. W. POTTRIGER,
 D. BENTON SILVIS.